United States Patent [19]

Okano et al.

[11] 4,358,253

[45] Nov. 9, 1982

[54] TURBOCHARGER FOR USE IN AN INTERNAL COMBUSTION ENGINE

[75] Inventors: Hiroshi Okano, Mishima; Masami Yamazaki, Toyota, both of Japan

[73] Assignee: Toyota Jidosha Kogyo Kabushiki Kaisha, Aichi, Japan

[21] Appl. No.: 169,523

[22] Filed: Jul. 21, 1980

[30] Foreign Application Priority Data

Apr. 1, 1980 [JP] Japan .................. 55/41142

[51] Int. Cl.³ .................. F04B 17/00; F16C 7/04; F16C 1/24
[52] U.S. Cl. .................. 417/407; 308/9; 308/122; 308/170
[58] Field of Search .................. 417/407, 408, 409; 308/9, 122, 170

[56] References Cited

U.S. PATENT DOCUMENTS

| | | | |
|---|---|---|---|
| 3,834,156 | 9/1974 | Cutler et al. | 417/407 |
| 4,128,283 | 12/1978 | Palmer | 417/407 |
| 4,256,441 | 3/1981 | Arora | 417/407 |

Primary Examiner—Carlton R. Croyle
Assistant Examiner—Peter M. Cuomo
Attorney, Agent, or Firm—Stevens, Davis, Miller & Mosher

[57] ABSTRACT

A turbocharger comprising a rotary shaft which is supported by a pair of floating radial bearings. A hollow sleeve is arranged between the floating radial bearings. The sleeve has an outer diameter which is substantially the same as that of the floating radial bearings. The sleeve has an inner diameter which is larger than that of the floating radial bearings. A step portion is formed on one end of the central portion of the rotary shaft. The runner member of a thrust bearing is fixed onto the other end of the central portion of the rotary shaft. The axial movement of the floating radial bearings and the hollow sleeve is restricted by the step portion and the runner member.

12 Claims, 6 Drawing Figures

TURBOCHARGER FOR USE IN AN INTERNAL COMBUSTION ENGINE

DESCRIPTION OF THE INVENTION

The present invention relates to a turbocharger for use in an internal combustion engine.

In a turbocharger, floating radial bearings having various constructions are used for supporting the rotary shaft of a turbocharger. For example, in a conventional turbocharger, the rotary shaft is supported by a pair of floating radial bearings arranged in the cylindrical bore which is formed in the housing of the turbocharger. In this conventional turbocharger, the axial movement of each of the floating radial bearings is restricted by a pair of snap rings which are fitted into ring grooves formed on the inner wall of the cylindrical bore. However, in the case wherein the axial movement of the floating radial bearings is restricted by a pair of snap rings, as mentioned above, a problem occurs in that the end faces of the floating radial bearings, which are in contact with the snap rings, will be damaged by the snap rings. In addition, in order to form the ring grooves on the inner wall of the cylindrical bore, a complicated machining process is necessary and, as a result, there is a problem in that the manufacturing cost of a turbocharger is increased. Furthermore, there has been proposed a turbocharger having a radial bearing assembly in which a pair of floating radial bearings is interconnected to each other via a spacer formed in one piece with both the floating radial bearings. In such a radial bearing assembly, since the axial length of the radial bearing assembly is very long, there is a problem in that a complicated and precise machining process is necessary. In addition, in this radial bearing assembly, since a pair of the floating radial bearings is caused to move together with each other, there is another problem in that a good damping operation of the radial bearing assembly cannot be ensured. In general, in a turbocharger, the temperature of the floating radial bearing, located at a position near the turbine of the turbocharger, becomes high as compared with that of the floating radial bearing, located at a position near the compressor of the turbocharger. However, in the case wherein a pair of the floating radial bearings is interconnected to each other via the spacer, as mentioned above, since the heat of the floating radial bearing located near the turbine is easily transferred to the floating radial bearing located near the compressor a problem occurs in that the temperature of the floating radial bearing, located near the compressor, becomes high. In addition, in the case wherein a pair of the floating radial bearings is interconnected to each other via the spacer, as mentioned above, since the lubricating oil located in the sliding zone of the floating radial bearings cannot easily escape, a problem occurs in that the friction loss of the floating radial bearings is increased.

An object of the present invention is to provide a turbocharger capable of restricting the axial movement of the rotary shaft of a turbocharger by a simple construction without damaging the floating radial bearings, and capable of reducing the friction loss of the floating radial bearings by always ensuring good lubrication of the floating radial bearings.

According to the present invention, there is provided a turbocharger comprising: a housing forming therein a cylindrical bore which has an inner wall and a uniform inner diameter over the entire length thereof; a rotary shaft having a central portion which has a uniform outer diameter and passes through said cylindrical bore and the other end; an impeller fixed onto one end of said rotary shaft; a turbine wheel fixed onto the other end of said rotary shaft; a first hollow cylindrical floating radial bearing inserted between said rotary shaft and the inner wall of said cylindrical bore; a second hollow cylindrical floating radial bearing inserted between said rotary shaft and the inner wall of said cylindrical bore and arranged to be spaced from said first floating radial bearing, each of said first and second floating radial bearings having an outer diameter which is slightly smaller than the inner diameter of said cylindrical bore, and having an inner diameter which is slightly larger than the outer diameter of said central portion of said rotary shaft; a hollow cylindrical sleeve inserted between said first floating radial bearing and said second floating radial bearing and between said rotary shaft and the inner wall of said cylindrical bore and having an outer diameter which is almost the same as that of said first and second floating radial bearings, said sleeve having opposed end faces and an inner diameter which is larger than that of said first and second floating radial bearings, each of said first and second floating radial bearings having an inner end face, arranged to face the corresponding end face of said sleeve, and an outer end face opposite to said inner end face; first stop means arranged on said rotary shaft and cooperating with the outer end face of said first floating radial bearing; and, second stop means arranged on said rotary shaft and cooperating with the outer end face of said second floating radial bearing, said first and second stop means being arranged to loosely support said first and second floating radial bearings and said sleeve for restricting the axial movement of said first and second floating radial bearings and said sleeve.

The present invention may be more fully understood from the description of a preferred embodiment of the invention set forth below, together with the accompanying drawings.

DESCRIPTION OF A PREFERRED EMBODIMENT

Figure 1:
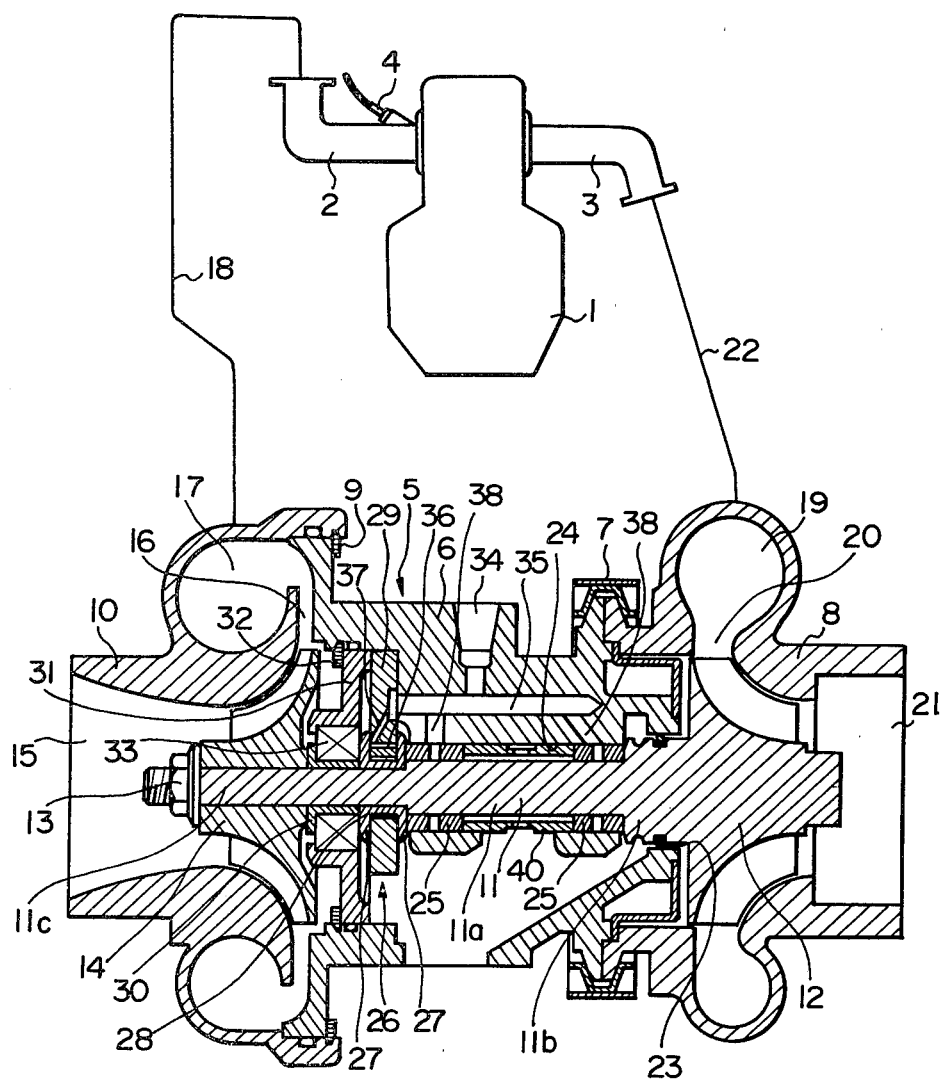
FIG. 1 is a cross-sectional side view of a turbocharger according to the present invention.

Referring to FIG. 1, 1 designates an engine body, 2 an intake manifold, 3 an exhaust manifold, 4 a fuel injector, and 5 a turbocharger. The turbocharger 5 comprises a center housing 6, a turbine housing 8 secured onto one end of the center housing 6 by a band 7, a compressor housing 10 secured onto the other end of the center housing 6 by a snap ring 9, a rotary shaft 11 rotatably inserted into the inside of the center housing 6, a turbine wheel 12 formed in one piece on one end of the rotary shaft 11, and an impeller 14 fixed onto the other end of the rotary shaft 11 by a nut 13. An air inlet 15, a vaneless diffuser 16 and a scroll shaped air discharge chamber 17 are formed in the compressor housing 10, and the air discharge chamber 17 is connected to the intake manifold 2 via an air duct 18. On the other hand, the turbine housing 8 has a scroll shaped exhaust gas inflow chamber 19, a turbine nozzle 20 and an exhaust gas outlet 21 therein, and the exhaust gas inflow chamber 19 is connected to the exhaust manifold 3 via an exhaust duct 22. When the engine is operating, the compressed air within the air discharge chamber 17, which is compressed by the rotating motion of the impeller 14, is fed into the intake manifold 2 via the air duct 18. Then, fuel is injected from the fuel injection 4 into the air which is fed into the intake manifold 2 and, thus, a mixture is formed within the intake manifold 2. After this, the mixture thus formed is fed into the cylinders of the engine body 1. The exhaust gas, discharged from the cylinders of the engine body 1 into the exhaust manifold 3, is fed into the exhaust gas inflow chamber 19 via the exhaust duct 22. The exhaust gas, fed into the exhaust gas inflow chamber 19, is injected from the turbine nozzle 20 to provide the rotating force for the turbine wheel 12 and, then, the exhaust gas is discharged from the exhaust gas outlet 21.

As illustrated in FIG. 1, the rotary shaft 11 comprises a central portion 11a, an increased diameter portion 11b and a reduced diameter portion 11c. A piston ring 23 for sealing is inserted between the center housing 6 and the increased diameter portion 11b of the rotary shaft 11. In addition, a pair of spaced floating radial bearings 25 are arranged within a cylindrical bore 24 which is formed within the center housing 6. The rotary shaft 11 is rotatably supported by a pair of the floating radial bearings 25. In order to axially support the rotary shaft 11, a thrust bearing 26 is arranged on the reduced diameter portion 11c of the rotary shaft 11. The thrust bearing 26 comprises a runner member 28 having a pair of disc shaped runners 27 thereon, and a stationary bearing plate 29 arranged between the runners 27 and slightly spaced from the runners 27. The runner member 28 is fixed onto the reduced diameter portion 11c of the rotary shaft 11 via a spacer 30 and the impeller 14 by the nut 13, and the stationary bearing plate 29 is fixed onto the center housing 6 via a partition member 31 by a snap ring 32. In addition, a seal 33, which is constructed in the form of a mechanical seal, is arranged between the partition member 31 and the spacer 30. A lubricating oil inlet port 34 and a lubricating oil distribution hole 35 are formed in the center housing 6, and the lubricating oil inlet port 34 is connected to the lubricating oil feed pump (not shown). A lubricating oil outflow bore 36, extending in parallel to the axis of the rotary shaft 11, is formed in the stationary bearing plate 29. This lubricating oil outflow bore 36 is connected to the lubricating oil distribution hole 35 via a lubricating oil bore 37. The lubricating oil is fed into the lubricating oil distribution hole 35 from the lubricating oil inlet port 34 and then fed into the lubricating oil outflow bore 36 via the lubricating oil bore 37. After this, the lubricating oil flows into the clearances between the stationary bearing plate 29 and the runners 27 and, thus, the lubricating operation of the thrust bearing 26 is carried out. A pair of lubricating oil feed bores 38, each extending from the lubricating oil distribution hole 35 towards the corresponding floating radial bearings 25, is formed in the center housing 6, and the lubricating operation of the floating radial bearings 25 is carried out by the lubricating oil flowing out from the lubricating oil feed bores 38.

Figure 2:
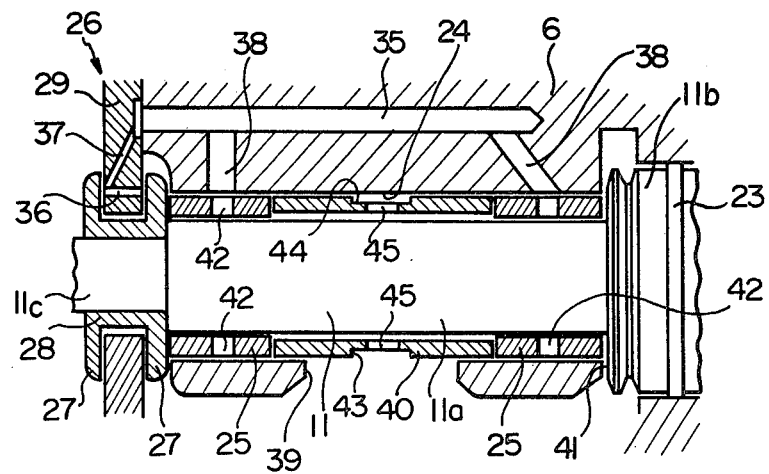
FIG. 2 is an enlarged cross-sectional side view of a portion of the turbocharger illustrated in FIG. 1.
Figure 3:
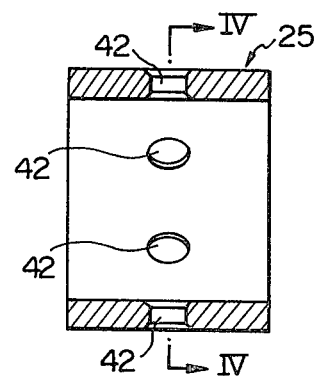
FIG. 3 is a cross-sectional side view of a floating radial bearing.
Figure 4:
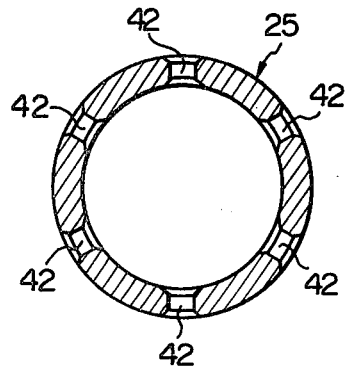
FIG. 4 is a cross-sectional view taken along the line IV—IV in FIG. 3.
Figure 5:
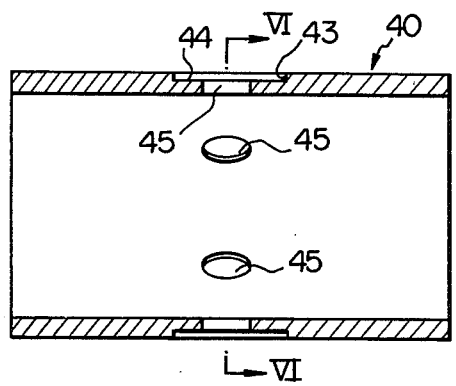
FIG. 5 is a cross-sectional side view of a hollow sleeve.
Figure 6:
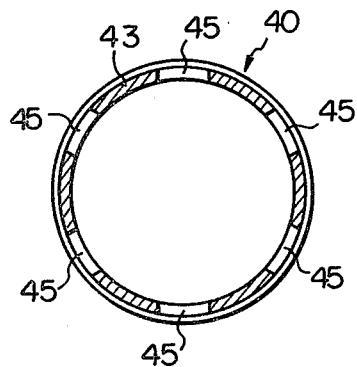
FIG. 6 is a cross-sectional view taken along the line VI—VI in FIG. 5.

Referring to FIG. 2, the cylindrical bore 24, formed in the center housing 6, has the same diameter over the entire length thereof and has a smooth inner wall on which no bore or recess such as a ring groove is formed, except for the lubricating oil feed bores 38 and a lubricating oil discharge opening 39. A pair of the hollow cylindrical floating radial bearings 25 having the same shape is inserted between the inner wall of the cylindrical bore 24 and the central portion 11a of the rotary shaft 11. In addition, a hollow cylindrical sleeve 40 is also inserted between the inner wall of the cylindrical bore 24 and the central portion 11a of the rotary shaft 11 at a position located between the floating radial bearings 25. As illustrated in FIG. 2, each of the floating radial bearings 25 has an outer diameter which is substantially the same as that of the hollow sleeve 40, and the hollow sleeve 40 has an inner diameter which is larger than that of the floating radial bearings 25. In addition, the outer diameters of the floating radial bearings 25 and the outer diameter of the hollow sleeve 40 are so formed that they are slightly smaller than the inner diameter of the cylindrical bore 24. Furthermore, from FIG. 2, it will be understood that the hollow sleeve 40 has a length which is longer than that of the floating radial bearings 25. The end face of the floating radial bearing 25, located at a position near the impeller 14 (FIG. 1), is arranged to face the outer end wall of the runner 27 so as to be contactable with it. In addition, the end wall of the floating radial bearing 25, located at a position near the turbine wheel 12 (FIG. 1), is arranged to face a step portion 41 formed at a position wherein the central portion 11a of the rotary shaft 11 is interconnected to the increased diameter portion 11b thereof. Consequently, the runner 27 and the step portion 41 function as stops for restricting the axial movement of the floating radial bearings 25 and the hollow sleeve 40. In addition, as illustrated in FIG. 2, the floating radial bearings 25 and the hollow sleeve 40 have such sizes that slight clearances are formed between the floating radial bearing 25 and the runner 27, between the floating radial bearings 25, and between the floating radial bearing 25 and the step portion 41. Consequently, the floating radial bearings 25 and the hollow sleeve 40 are loosely supported between the runner 27 and the step portion 41. As illustrated in FIGS. 2 through 4, a plurality of lubricating oil flow bores 42 is formed in the central portion of the circumferential wall of each of the floating radial bearings 25, and each of the lubricating oil feed bores 38 is so arranged that it can be aligned with the lubricating oil feed bores 42 of the corresponding floating radial bearing 25. In addition, as illustrated in FIGS. 2, 5 and 6, an annular groove 43, extending along the entire outer circumferential wall of the hollow sleeve 40, is formed on the central portion of the outer circumferential wall of the hollow sleeve 40. Furthermore, a plurality of lubricating oil flow bores 45, interconnecting the bottom wall 44 of the groove 43 to the inner wall of the hollow sleeve 40, is formed in the hollow sleeve 40.

When the turbocharger 5 is operating, lubricating oil is fed from the lubricating oil feed bores 38 onto the outer circumferential walls of the floating radial bearings 25. Then, a part of the lubricating oil flows into the clearance between the cylindrical bore 24 and the floating radial bearings 25, and the remaining part of the lubricating oil flows into the clearance between the rotary shaft 11 and the floating radial bearings 25 via the lubricating oil flow bores 42. The lubricating oil, fed into the clearance between the cylindrical bore 24 and the floating radial bearings 25, flows, on one hand, towards the runner 27 or the step portion 41 and flows, on other hand, into the clearance between the cylindrical bore 24 and the hollow sleeve 40. Then, the lubricating oil, fed into the clearance between the cylindrical bore 24 and the hollow sleeve 40, flows into the groove 43 of the hollow sleeve 40 and then, is discharged from the lubricating oil discharge opening 39. In addition, the lubricating oil, fed into the clearance between the rotary shaft 11 and the floating radial bearings 25, flows, on one hand, towards the runner 27 or the step portion 41 and flows, on the other hand, into the clearance having a large size between the hollow sleeve 40 and the rotary shaft 11. Then, the lubricating oil, fed into the clearance between the hollow sleeve 40 and the rotary shaft 11, is discharged from the lubricating oil discharge opening 39 via the lubricating oil flow bores 45.

When the rotary shaft 11 rotates, the floating radial bearings 25 are rotated in a rotating direction, which is the same as that of the rotary shaft 11, and at a speed which is lower than that of the rotary shaft 11. At this time, the clearance between the cylindrical bore 24 and the floating radial bearings 25 is almost the same as that of the clearance between the rotary shaft 11 and the floating radial bearings 25. On the other hand, since the viscous resistance between the rotary shaft 11 and the circumferential inner wall of the hollow sleeve 40 is smaller than that between the rotary shaft 11 and the circumferential inner walls of the floating radial bearings 25, the hollow sleeve 40 is rotated in a rotating direction, which is the same as that of the rotary shaft 11, and at a speed which is lower than that of the floating radial bearings 25. Consequently, since the relative rotation is caused between the end faces of the hollow sleeve 40 and the end faces of the floating radial bearings 25, it is possible to prevent the end faces of the hollow sleeve 40 and the end faces of the floating radial bearings 25 from partially wearing. As a result, it is possible to always form a lubricating oil layer having a uniform thickness between the end faces of the hollow sleeve 40 and the end faces of the floating radial bearings 25.

According to the present invention, since the lubricating oil layer having a uniform thickness is always formed between the end faces of the hollow sleeve 40 and the end faces of the floating radial bearings 25, as mentioned above, a smoothly sliding operation is ensured between the end faces of the hollow sleeve 40 and the end faces of the floating radial bearings 25. As a result of this, since the amount of wear in the end faces of the hollow sleeve 40 and in the end faces of the floating radial bearings 25 is extremely reduced, it is possible to ensure a long life of the floating radial bearings 25. In addition, the axial movement of the rotary shaft 11 is not restricted by the floating radial bearings 25 and the hollow sleeve 40, but is restricted only by the thrust bearing 26. This results in the advantage that an extremely high accuracy is not required for the axial sizes of the floating radial bearings 25 and the hollow sleeve 40. Furthermore, in the present invention, the temperature of the floating radial bearing 25, located at a position near the turbine wheel 12, becomes higher than that of the floating radial bearing 25, located at a position near the impeller 14 and, as a result, a difference in thermal expansion occurs between the floating radial bearings 25. However, even if the difference in thermal expansion occurs between the floating radial bearings 25, the clearances between the hollow sleeve 40 and the floating radial bearings 25 are automatically adjusted so that they become equal to each other. As a result of this, since suitable lubricating oil layers are always formed between the end faces of the hollow sleeve 40 and the end faces of the floating radial bearings 25, it is possible to improve the lifetime of the floating radial bearings 25. In addition, the cylindrical bore 24 has a fixed diameter over the entire length thereof, and it is not necessary to form ring grooves on the inner wall of the cylindrical bore 24. As a result of this, there is the advantage that the cylindrical bore 24 can be easily formed and, accordingly, the accuracy in the size of the cylindrical bore 24 is improved. Furthermore, the open ends of each of the lubricating oil flow bores 45 of the hollow sleeve 40 do not contact with the inner wall of the cylindrical bore 24 and the rotary shaft 11. Therefore, even if the circumferential edges of the open ends of each of the lubricating oil flow bores 45 are not beveled, the inner wall of the cylindrical bore 24 and the rotary shaft 11 are not damaged by the circumferential edges of the open ends of the lubricating oil flow bores 45. Consequently, there is an advantage that the machining operation of the lubricating oil flow bores 45 becomes easy.

While the invention has been described by reference to a specific embodiment chosen for purposes of illustration, it should be apparent that numerous modifications could be made thereto by those skilled in the art without departing from the spirit and scope of the invention.

We claim:
1. A turbocharger comprising:
a housing forming therein a cylindrical bore which has an inner wall and a uniform inner diameter over the entire length thereof;
a rotary shaft having a central portion which has a uniform outer diameter and passes through said cylindrical bore;
an impeller fixed onto one end of said rotary shaft;
a turbine wheel fixed onto the other end of said rotary shaft;
a first hollow cylindrical floating radial bearing inserted between said rotary shaft and the inner wall of said cylindrical bore;
a second hollow cylindrical floating radial bearing inserted between said rotary shaft and the inner wall of said cylindrical bore and arranged to be spaced from said first floating radial bearing, each of said first and second floating radial bearings having an outer diameter which is slightly smaller than the inner diameter of said cylindrical bore, and having an inner diameter which is slightly larger than the outer diameter of said central portion of said rotary shaft;
a hollow cylindrical sleeve inserted between said first floating radial bearing and said second floating radial bearing and between said rotary shaft and the inner wall of said cylindrical bore and having an outer diameter which is substantially the same as that of said first and second floating radial bearings, said sleeve having opposed end faces and an inner diameter which is larger than that of said first and second floating radial bearings, such of said first and second floating radial bearings having an inner end face arranged to face the corresponding end face of said sleeve, and an outer end face opposite to said inner end face, said sleeve being freely rotatable and freely movable in the axial direction;

first stop means arranged on said rotary shaft and cooperating with the outer end face of said first floating radial bearing; and, second stop means arranged on said rotary shaft and cooperating with the outer end face of said second floating radial bearing, said first and second stop means being arranged to loosely support said first and second floating radial bearings and said sleeve for restricting the axial movement of said first and second floating radial bearings and said sleeve.

2. A turbocharger as claimed in claim 1, wherein said housing forms therein a plurality of lubricating oil feed bores, each having an opening which opens into said cylindrical bore, each of said openings of said lubricating oil feed bores being arranged to face an outer circumferential wall of the corresponding first and second floating radial bearings.

3. A turbocharger as claimed in claim 2, wherein each of said first and second floating radial bearings has a plurality of radially extending lubricating oil flow bores, each being arranged at a position wherein it can be aligned with the corresponding openings of said lubricating oil feed bores.

4. A turbocharger as claimed in claim 1, wherein said sleeve has an axial length which is longer than that of said first and second floating radial bearings.

5. A turbocharger as claimed in claim 1, wherein said first and second floating radial bearings have the same construction and size.

6. A turbocharger as claimed in claim 1, wherein said sleeve has an annular groove formed on an outer circumferential wall thereof and extending along the entire outer circumferential wall thereof.

7. A turbocharger as claimed in claim 6, wherein said sleeve has a plurality of radially extending lubricating oil flow bores, each being arranged in the annular groove of said sleeve.

8. A turbocharger as claimed in claim 1, wherein said first stop means is formed by a portion of said rotary shaft.

9. A turbocharger as claimed in claim 8, wherein said rotary shaft comprises an increased diameter portion and a step portion formed at a position wherein the central portion of said rotary shaft is interconnected to said increased diameter portion, said first stop means being said step portion.

10. A turbocharger as claimed in claim 1, wherein said second stop means comprises a member fixed onto said rotary shaft and arranged to face the outer end face of said second floating radial bearing.

11. A turbocharger as claimed in claim 10, wherein said turbocharger further comprises a thrust bearing which comprises a stationary bearing plate fixed onto said housing, and the member of said second stop means comprises a runner member.

12. A turbocharger as claimed in claim 11, wherein said rotary shaft comprises a reduced diameter portion and a step portion formed at a position wherein the central portion of said rotary shaft is interconnected to said reduced diameter portion, said runner member abutting against said step portion.

* * * * *